United States Patent
Zhang

(10) Patent No.: US 11,922,093 B2
(45) Date of Patent: Mar. 5, 2024

(54) DEVICE CONTROL METHOD AND APPARATUS

(71) Applicant: BEIJING XIAOMI MOBILE SOFTWARE CO., LTD., Beijing (CN)

(72) Inventor: Daolin Zhang, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 454 days.

(21) Appl. No.: 17/214,547

(22) Filed: Mar. 26, 2021

(65) Prior Publication Data

US 2021/0397406 A1 Dec. 23, 2021

(30) Foreign Application Priority Data

Jun. 23, 2020 (CN) .......................... 202010582097.7

(51) Int. Cl.
*G06F 3/16* (2006.01)
*G01S 3/80* (2006.01)
*G01S 3/808* (2006.01)
*G01S 3/82* (2006.01)

(52) U.S. Cl.
CPC ............ *G06F 3/165* (2013.01); *G01S 3/8006* (2013.01); *G01S 3/8083* (2013.01); *G01S 3/82* (2013.01)

(58) Field of Classification Search
CPC ........ G06F 3/165; G06F 3/162; G06F 16/683; G06F 16/68
USPC ......................................................... 700/94
See application file for complete search history.

(56) References Cited

U.S. PATENT DOCUMENTS

| | | | |
|---|---|---|---|
| 7,995,770 B1* | 8/2011 | Simon | H04R 3/005 455/42 |
| 8,588,432 B1* | 11/2013 | Simon | H04R 27/00 381/98 |
| 10,299,061 B1 | 5/2019 | Sheen | |
| 2005/0152557 A1 | 7/2005 | Sasaki | |
| 2006/0045294 A1* | 3/2006 | Smyth | H04S 7/304 381/74 |
| 2010/0135118 A1 | 6/2010 | Van Leest | |
| 2010/0195842 A1* | 8/2010 | Sibbald | G10K 11/17861 381/71.6 |
| 2012/0020189 A1 | 1/2012 | Agevik | |
| 2013/0342669 A1 | 12/2013 | Hsu | |

(Continued)

FOREIGN PATENT DOCUMENTS

| | | |
|---|---|---|
| CN | 103995506 A | 8/2014 |
| CN | 105264914 A | 1/2016 |

(Continued)

OTHER PUBLICATIONS

Notice of Allowance of the Chinese application No. 202010582097.7, dated Oct. 11, 2021, (4 pages).

(Continued)

*Primary Examiner* — Alexander Krzystan
(74) *Attorney, Agent, or Firm* — Arch & Lake LLP

(57) ABSTRACT

Provided are a device control method and apparatus. The method is applied to an audio device, and includes: receiving an acoustic signal set, determining a propagation characteristic of an acoustic signal in the acoustic signal set, determining, according to the propagation characteristic, a device parameter associated with audio play quality to be used by the audio device, and controlling the audio device to play audio with the device parameter.

18 Claims, 2 Drawing Sheets

(56) References Cited

U.S. PATENT DOCUMENTS

| | | | |
|---|---|---|---|
| 2017/0070820 A1* | 3/2017 | Behringer | G06V 20/20 |
| 2017/0280265 A1 | 9/2017 | Po | |
| 2020/0077219 A1 | 3/2020 | Sheen | |
| 2020/0196083 A1 | 6/2020 | Sheen | |
| 2020/0245088 A1 | 7/2020 | Po | |
| 2021/0076151 A1 | 3/2021 | Sheen | |
| 2021/0385602 A1 | 12/2021 | Po | |

FOREIGN PATENT DOCUMENTS

| | | |
|---|---|---|
| CN | 105828225 A | 8/2016 |
| CN | 106027755 A | 10/2016 |
| CN | 106487984 A | 3/2017 |
| CN | 109040911 A | 12/2018 |
| CN | 109298847 A | 2/2019 |
| CN | 109996134 A | 7/2019 |
| CN | 110267155 A | 9/2019 |
| CN | 110663173 A | 1/2020 |
| CN | 110851102 A | 2/2020 |
| CN | 111208970 A | 5/2020 |
| WO | 2020119899 A1 | 6/2020 |

OTHER PUBLICATIONS

Supplementary European Search Report in the European application No. 21165490.0, dated Jan. 24, 2022, (21 pages).
First Office Action of the Chinese application No. 202010582097.7, dated Feb. 1, 2021.

* cited by examiner

DEVICE CONTROL METHOD AND APPARATUS

CROSS-REFERENCE TO RELATED APPLICATION

The present application is based upon and claims priority to Chinese Patent Application 202010582097.7, filed on Jun. 23, 2020, the disclosure of which is hereby incorporated by reference in its entirety for all purposes.

TECHNICAL FIELD

The present disclosure relates to the technical field of computer communications, and more particularly, to a device control method and apparatus.

BACKGROUND

Audio devices such as loudspeaker boxes, smartphones capable of playing audio and tablets capable of playing audio have an audio play function. At present, the audio devices play audio with device parameters that are manually set by users, which results in the relatively single audio play mode.

SUMMARY

In order to overcome the problem in the related art, a device control method and apparatus are provided in the disclosure.

According to a first aspect of the present disclosure, a device control method is provided, which may be applied to an audio device, and includes: receiving an acoustic signal set; determining a propagation characteristic of an acoustic signal in the acoustic signal set; determining, according to the propagation characteristic, a device parameter associated with audio play quality to be used by the audio device; and controlling the audio device to play audio with the device parameter.

According to a second aspect of the present disclosure, provided is an audio device, including: a processor; and a memory, configured to store processor-executable instructions, wherein the processor is configured to: receive an acoustic signal set; determine a propagation characteristic of an acoustic signal in the acoustic signal set; determine, according to the propagation characteristic, a device parameter associated with audio play quality to be used by the audio device; and control the audio device to play audio with the device parameter.

According to a third aspect of the present disclosure, provided is a non-transitory computer-readable storage medium having stored thereon a computer program that, when being executed by a processor, implements a device control method. The device control method includes: receiving an acoustic signal set; determining a propagation characteristic of an acoustic signal in the acoustic signal set; determining, according to the propagation characteristic, a device parameter associated with audio play quality to be used by the audio device; and controlling the audio device to play audio with the device parameter It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

DETAILED DESCRIPTION

Figure 1:
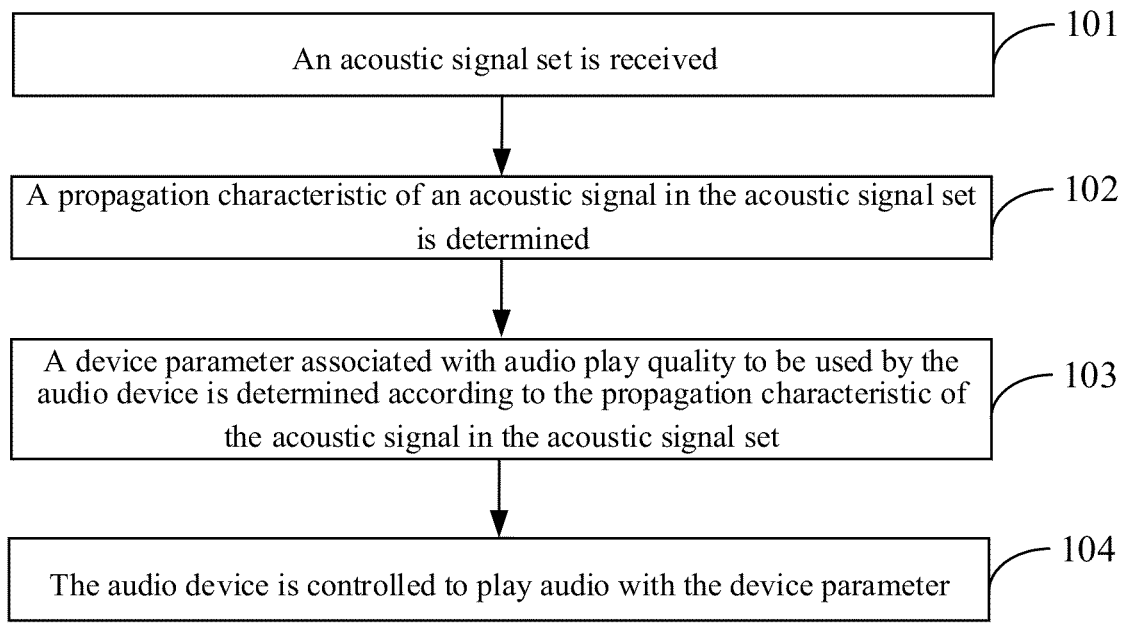
FIG. 1 illustrates a flowchart of a device control method according to an example of the present disclosure.

Reference will now be made in detail to embodiments of the present disclosure, examples of which are illustrated in the accompanying drawings. The following description refers to the accompanying drawings in which the same numbers in different drawings represent the same or similar elements unless otherwise represented. The implementations set forth in the following description of examples of the present disclosure do not represent all implementations consistent with the present disclosure. Instead, they are merely examples of apparatuses and methods consistent with aspects related to the present disclosure as recited in the appended claims.

Terms used in the present disclosure are only adopted for the purpose of describing specific examples and are not intended to limit the present disclosure. "A/an", "said" and "the" in a singular form in the present disclosure and the appended claims are also intended to include a plural form, unless other meanings are clearly denoted throughout the present disclosure. It is also to be understood that term "and/or" used in the present disclosure refers to and includes one or any or all possible combinations of multiple associated items that are listed.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It is to be understood that, although terms first, second, third and the like may be used to describe various information in the present disclosure, the information should not be limited to these terms. These terms are only used to distinguish the information of the same type. For example, without departing from the scope of the present disclosure, first information may also be referred to as second information and, and similarly, second information may also be referred to as first information. For example, term "if" used here may be explained as "while" or "when" or "responsive to determining", which depends on the context.

As used herein, the term "if" or "when" may be understood to mean "upon" or "in response to" depending on the context. These terms, if appear in a claim, may not indicate that the relevant limitations or features are conditional or optional.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1 illustrates a flowchart of a device control method according to an example of the present disclosure. The method illustrated in FIG. 1 may be applied to an audio device, and include the following actions.

In 101, an acoustic signal set is received.

The audio device has an audio play function, and may be a loudspeaker box, a mobile phone capable of playing audio, a tablet capable of playing the audio, or the like.

In the examples of the present disclosure, the audio device is provided with a microphone, and can receive an acoustic signal.

In 102, a propagation characteristic of an acoustic signal in the acoustic signal set is determined.

The propagation characteristic of the acoustic signal is a characteristic that the acoustic signal presents during propagation, such as sending time, receiving time, a propagation speed, a propagation direction, a propagation duration, a propagation distance, and a signal intensity.

In an example, the terminal sends acoustic signals at different positions around the audio device. In this case, the acoustic signal set received by the audio device includes: the acoustic signals sent by the terminal at the different positions around the audio device. The audio device may determine a propagation duration, a propagation speed and a propagation direction of the acoustic signals in the acoustic signal set.

When sending the acoustic signal, the terminal may control the acoustic signal to carry sending time of the acoustic signal. In this case, upon the reception of the acoustic signal, the terminal determines receiving time of the acoustic signal, acquires the sending time carried in the acoustic signal, and obtains the propagation duration of the acoustic signal by subtracting the sending time of the acoustic signal from the receiving time of the acoustic signal.

There may be a variety of modes that the terminal controls the acoustic signal to carry the sending time. For example, the terminal may control, based on frequency information of the acoustic signal, the acoustic signal to carry the sending time. For example, based on a pre-established correspondence relationship between frequencies and digits, by controlling the frequency of the acoustic signal, the terminal controls the acoustic signal to carry the sending time. Alternatively, based on a pre-established correspondence relationship between frequency bands and digits, by controlling the frequency band of the acoustic signal, the terminal controls the acoustic signal to carry the sending time.

Correspondingly, in the case where the received acoustic signal includes signals associated with different frequency information, the audio device determines a digit corresponding to each piece of frequency information based on a preset correspondence relationship between frequency information and digits, combines digits corresponding to all the different frequency information, and determines, based on the combined digits, the sending time of the acoustic signal sent by the terminal at the position.

For example, it is preset that the frequency band 21000-21100 corresponds to the digit 1, the frequency band 21100-21200 corresponds to the digit 2, the frequency band 21200-21300 corresponds to the digit 3 and the like. The audio device performs frequency band analysis on the received acoustic signal, determines multiple frequency bands corresponding to the acoustic signal, determines a digit corresponding to each of the multiple frequency bands, and combines digits corresponding to the multiple frequency bands in sequence, so as to determine the sending time of the acoustic signal.

In applications, after combining the digits in sequence, the audio device may determine, in combination with clock information of its own, which among the digits represent "hour", which among the digits represent "minute" and which among the digits represent "second", thereby determining the sending time of the acoustic signal.

For example, as the time information generally includes (or may be represented by) information in three dimensions, i.e., hour, minute and second, the time information may be represented by 6 digits, the first two digits indicating the hour, third and fourth digits indicating the minute, and the last two digits indicating the second.

An example of the correspondence relationship between frequency bands and digits is provided below to explain that the sending time of acoustic signals received by the audio device may be determined based on these acoustic signals.

In the example, frequency band 21000-21100 corresponds to the digit 1, the frequency band 21100-21200 corresponds to the digit 2, the frequency band 21200-21300 corresponds to the digit 3, . . . , the frequency band 21800-21900 corresponds to the digit 9, and the frequency band 200000-201000 corresponds to the digit 0.

Through analyzing the frequency bands of the acoustic signals received by the audio device, the audio device obtains the following frequency bands successively: frequency band 200000-201000, frequency band 21100-21200, frequency band 21200-21300, frequency band 21800-21900, frequency band 21300-21400, and frequency band 21100-21200. According to the obtained frequency bands and the correspondence relationship between frequency bands and digits, six digits 0, 2, 3, 9, 4, 2 are obtained correspondingly. The six digits are combined. Generally, the digits may be combined in sequence, to obtain "023942". As the time information generally includes (or may be represented by) information in three dimensions, i.e., hour, minute and second, each dimension including 2 digits, the combined digits "023942" may be resolved as the sending time of the acoustic signal being 02: 39: 42.

The acoustic signal has a fixed propagation speed in a specific propagation medium. For example, under the conditions of a normal atmospheric pressure and 15° C. in the air, the propagation speed of the acoustic signal is about 340 m/s.

The audio device is provided with a microphone array. The microphone array is used to determine the propagation direction of the acoustic signal.

In an example, the terminal sends the acoustic signal, and the acoustic signal is reflected when encountering an obstacle. In this case, the acoustic signal set received by the audio device includes: the acoustic signal sent by the terminal device and a reflection signal of the acoustic signal sent by the terminal. The audio device may determine the receiving time of the acoustic signals in the acoustic signal set.

In 103, a device parameter associated with audio play quality to be used by the audio device is determined according to the propagation characteristic of the acoustic signal in the acoustic signal set.

The audio device has a variety of device parameters associated with the audio play quality. For example, the device parameter may include at least one of the following: a device parameter for adjusting a frequency response, a device parameter for adjusting loudness (also referred to as volume), a device parameter for adjusting a phase of an acoustic signal, and a device parameter for adjusting reverberation. The audio play quality of the audio device may be adjusted by adjusting the parameter value of the device parameter.

For example, the audio device is provided with an apparatus for adjusting the frequency response, and can determine, according to the propagation characteristic of the acoustic signal, usage information of the apparatus for adjusting the frequency response, i.e., the device parameter for adjusting the frequency response. For another example, the audio device is provided with an apparatus for adjusting the loudness, and may determine, according to the propagation characteristic of the acoustic signal, usage information of the apparatus for adjusting the loudness, i.e., the device parameter for adjusting the loudness.

In an example, the acoustic signal set includes acoustic signals sent by a terminal at different positions around the audio device. The propagation characteristic includes a propagation duration, a propagation speed and a propagation direction. On this basis, the audio device may determine the device parameter associated with the audio play quality to be used by the audio device in the following way. In a first action, for an acoustic signal sent by the terminal at each of the different positions, a distance between the position and the audio device is calculated according to a propagation duration and a propagation speed of the acoustic signal sent by the terminal at the position. In a second action, the device parameter associated with the audio play quality to be used by the audio device is determined according to distances between from the different positions to the audio device and propagation directions of the acoustic signals.

For the second action, for example, first of all, a region enclosed by the different positions is determined according to the distances from the different positions to the audio device and the propagation directions of the acoustic signals; next, a size of the region, and/or position information of the audio device within the region are determined; and then, the device parameter associated with the audio play quality to be used by the audio device is determined according to the determined size of the region and/or position information of the audio device within the region.

The region where the audio device is located may be a planar region or a spatial region. The size of the region where the audio device is located may be an area of the planar region, or may be the volume of the spatial region, or may be an area of a boundary surface of the spatial region, etc. For example, the loudspeaker box is located in a room, and the size of the region where the loudspeaker box is located may be the volume of the room, or, may be the ground area of the room.

The size of the region where the audio device is located has influence on the audio play quality of the audio device. For example, when the audio device plays audio in a certain volume, if the size of the region where the audio device is located is large, the volume of the audio that propagates to the edge of the region is small and the user may hardly hear the audio content clearly; and if the size of the region where the audio device is located is small, the volume of the audio that propagates to the edge of the region is large and the user may have auditory discomfort.

The position of the audio device within the region has influence on the audio play quality of the audio device. When the audio device plays audio with the same device parameter at different positions within the region, the audio play quality of the audio device is different. For example, it is configured that the device parameter for adjusting the frequency response has a parameter value of a. When the audio device is located in a center of the region, the audio that propagates to the edge of the region has good quality in the case where the device parameter having the parameter value of a is used to play the audio. When the audio device deviates from the center of the region and is close to an obstacle at the edge of the region, in the case where the device parameter having the parameter value of a is used to play the audio, the audio that propagates to the edge of the region has poor quality, and phenomena such as a heavy bass and an excessively high pitch may occur.

Therefore, the device parameter associated with the audio play quality to be used by the audio device may be determined according to either or both of the size of the region where the audio device is located and the position information of the audio device within the region.

Figure 2:
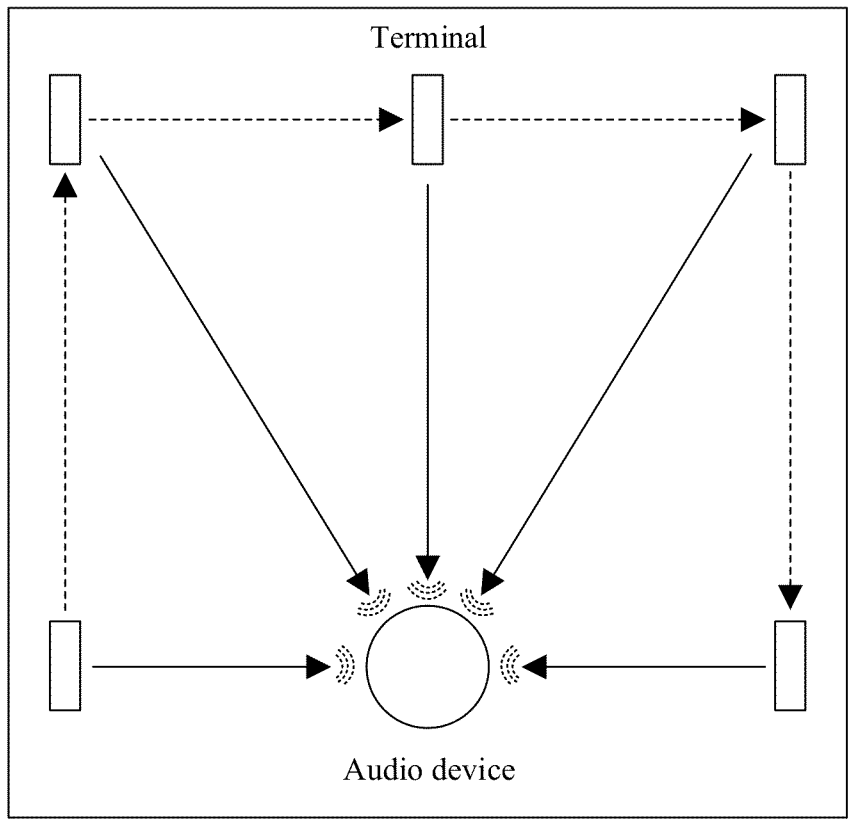
FIG. 2 illustrates a schematic diagram of an application scenario according to an example of the present disclosure.

Exemplarily, FIG. 2 illustrates a schematic diagram of an application scenario according to an example of the present disclosure. In the scenario illustrated in FIG. 2, the circle represents a loudspeaker box, the smaller rectangles represent a mobile phone and the larger rectangle represents the room. The loudspeaker box is located in the room and is positionally fixed; and the user holds the mobile phone to move along the edge of the room and controls the mobile phone to send acoustic signals at different positions.

In the scenario, the acoustic signal sent by the mobile phone carries sending time of the acoustic signal. The loudspeaker box is provided with a microphone array. Upon receiving an acoustic signal sent by the mobile phone at a position, the loudspeaker box determines receiving time of the acoustic signal, acquires the sending time carried in the acoustic signal, and obtains the propagation duration of the acoustic signal by subtracting the sending time from the receiving time of the acoustic signal; and obtains a propagation distance of the acoustic signal by multiplying the propagation duration of the acoustic signal by a propagation speed. Moreover, the loudspeaker box determines a propagation direction of the acoustic signal by using the microphone array, determines a size of the room and position information of the loudspeaker box in the room according to distances from positions to the loudspeaker box and propagation directions of acoustic signals. Then, the loudspeaker box determines, according to the size of the room and the position information of the loudspeaker box in the room, a device parameter associated with the audio play quality to be used by the loudspeaker, and plays audio with the determined device parameter, such that the audio that propagates to each position has good quality.

In an example, the acoustic signal set includes an acoustic signal sent by a terminal at a position and a reflection signal of the acoustic signal sent by the terminal; and the propagation characteristic includes receiving time. On this basis, the audio device may determine the device parameter associated with the audio play quality to be used by the audio device in the following way. Firstly, a time difference between receiving time of the acoustic signal sent by the terminal and receiving time of the reflection signal of the acoustic signal sent by the terminal is calculated; and then, the device parameter associated with the audio play quality to be used by the audio device is determined according to the time difference.

After the terminal sends one acoustic signal, multiple reflection signals may be produced, such that the acoustic signal set received by the audio device includes the acoustic signal and the multiple reflection signals of the acoustic signal. On this basis, the audio device may determine an earliest received reflection signal among the multiple reflection signals, calculate a time difference between the receiving time of the acoustic signal and receiving time of the earliest received reflection signal, and determine, according to the calculated time difference, the device parameter associated with the audio play quality to be used by the audio device.

For example, when the time difference between the receiving time of the acoustic signal and the receiving time of the reflection signal thereof is small, it is indicated that the distance between the terminal and the obstacle is very close. In this case, the audio play quality needs to be considered from factors such as the frequency response and the loudness. The audio device may determine the device parameter associated with the audio play quality to be used by the audio device, according to the time difference, or according to the time difference and the propagation speed of the acoustic signal (it may be understood as the distance between the terminal and the obstacle), so as to ensure the quality of the audio that propagates to the terminal.

In 104, the audio device is controlled to play audio with the device parameter.

After the audio device determines, according to the propagation characteristic of the acoustic signal in the acoustic signal set, the device parameter associated with the audio play quality to be used by the audio device, the audio device is controlled to play the audio with the determined device parameter, so as to ensure the quality of the audio that propagates to the terminal.

When the audio device receives the acoustic signals sent by the terminal at different positions, the audio device is controlled to play the audio based on the method provided by the example of the present disclosure, which can ensure the quality of the audio that propagates to each position.

In the examples of the present disclosure, an audio device receives an acoustic signal set, determines a propagation characteristic of an acoustic signal in the acoustic signal set, determines, according to the propagation characteristic, a device parameter associated with audio play quality to be used by the audio device, and controls the audio device to play audio with the device parameter. In the examples of the present disclosure, the audio device can dynamically adjust the device parameter of the audio device according to the propagation characteristic of the received acoustic signal, and play the audio according to the dynamically adjusted device parameter, thereby enriching audio play modes and ensuring the audio play quality.

For simple description, each of the above method examples is expressed as a combination of a series of operations, but those skilled in the art should know that the present disclosure is not limited to the described operation sequence because some actions may be executed in other sequences or at the same time according to the present disclosure.

In addition, the person skilled in the art should also appreciate that all the examples described in the specification are optional examples, and the related actions and modules are not necessarily mandatory to the present disclosure.

Corresponding to the above method example for realizing application functions, the present disclosure further provides examples for realizing application functions and a corresponding terminal.

Figure 3:
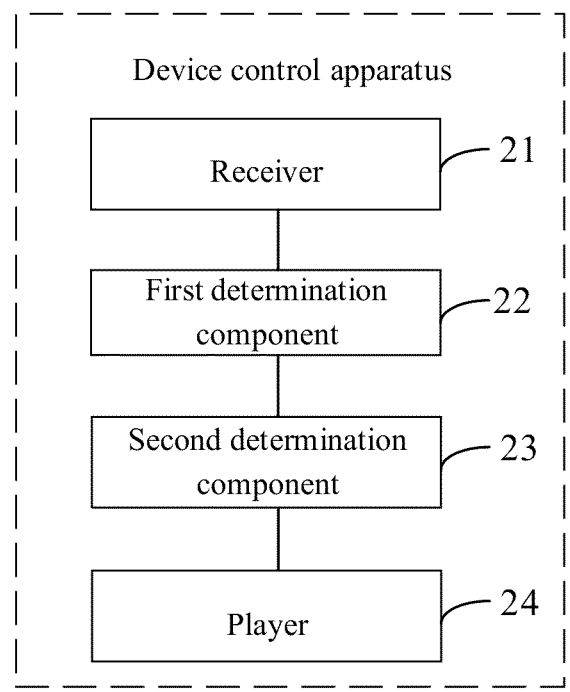
FIG. 3 illustrates a block diagram of a device control apparatus according to an example of the present disclosure.

FIG. 3 illustrates a block diagram of a device control apparatus according to an example of the present disclosure. The apparatus may be applied to an audio device, and include: a receiver 21, a first determination component 22, a second determination component 23 and a player 24.

The receiver 21 is configured to receive an acoustic signal set.

The first determination component 22 is configured to determine a propagation characteristic of an acoustic signal in the acoustic signal set.

The second determination component 23 is configured to determine, according to the propagation characteristic, a device parameter associated with audio play quality to be used by the audio device.

The player 24 is configured to control the audio device to play audio with the device parameter.

In an optional example, on the basis of the device control apparatus illustrated in FIG. 3, the acoustic signal set includes acoustic signals sent by a terminal at different positions around the audio device. The propagation characteristic includes a propagation duration, a propagation speed and a propagation direction. The second determination component 23 may include: a first calculation sub-component, and a first determination sub-component.

The first calculation sub-component is configured to: for each of the different positions, calculate a respective distance between the position and the audio device according to a propagation duration and a propagation speed of an acoustic signal sent by the terminal at the position.

The first determination sub-component is configured to: determine the device parameter according to distances from the different positions to the audio device and propagation directions of the acoustic signals.

In an optional example, the first determination sub-component may include: a first determination element, a second determination element and a third determination element.

The first determination element is configured to determine, according to the distances from the different positions to the audio device and the propagation directions of the acoustic signals, a region enclosed by the different positions.

The second determination element, configured to determine at least one of: a size of the region, or position information of the audio device within the region.

The third determination element is configured to determine the device parameter according to the at least one of: the size of the region, or the position information of the audio device within the region.

In an optional example, each of the acoustic signals carries respective sending time. The audio device includes a microphone array. The first determination sub-component may include: a fourth determination element, an acquisition element, a fifth determination element and a sixth determination element.

The fourth determination element is configured to: in response to receiving the acoustic signal sent by the terminal at each of the different positions, determine receiving time of the acoustic signal sent by the terminal at the position.

Then acquisition element is configured to acquire sending time carried in the acoustic signal sent by the terminal at the position.

The fifth determination element is configured to determine, according to the receiving time and the sending time of the acoustic signal sent by the terminal at the position, the propagation duration of the acoustic signal sent by the terminal at the position.

The sixth determination element is configured to determine the propagation direction of the acoustic signal by using the microphone array.

In an optional example, the acquisition element may include: a first determination sub-element, a combination sub-element, and a second determination sub-element.

The first determination sub-element is configured to: in response to that the acoustic signal sent by the terminal at the position includes signals associated with different frequency information, determine a digit corresponding to each piece of the different frequency information based on a preset correspondence relationship between frequency information and digits.

The combination sub-element is configured to combine digits corresponding to the different frequency information.

The second determination sub-element is configured to determine, based on the combined digits, the sending time of the acoustic signal sent by the terminal at the position.

In an optional example, based on the device control apparatus illustrated in FIG. 3, the acoustic signal set includes an acoustic signal sent by a terminal at a position and a reflection signal of the acoustic signal sent by the terminal. The propagation characteristic includes receiving time. The second determination component 23 may include: a second calculation sub-component and a second determination sub-component.

The second calculation sub-component is configured to calculate a time difference between receiving time of the acoustic signal sent by the terminal and receiving time of the reflection signal of the acoustic signal sent by the terminal.

The second determination sub-component is configured to determine the device parameter according to the time difference.

In an optional example, the second calculation sub-component may include: a determination element, and a calculation element.

The determination element is configured to: in response to that the acoustic signal set includes a plurality of reflection signals of the acoustic signal sent by the terminal, determine an earliest received reflection signal among the plurality of reflection signals.

The calculation element is configured to calculate a time difference between the receiving time of the acoustic signal sent by the terminal and receiving time of the earliest received reflection signal.

In an optional example, the device parameter includes at least one of the following: a device parameter for adjusting a frequency response, a device parameter for adjusting loudness, a device parameter for adjusting a phase, or a device parameter for adjusting reverberation.

The device example substantially corresponds to the method example, the description in the method example may be referred to for relevant part. The above described device example is merely schematic. The elements described as separate parts may or may not be physically separate, and parts displayed as elements may or may not be physical elements, may be located in one place, or may be distributed on a plurality of network units. Some or all of the components may be selected according to actual needs to achieve the objectives of the solutions of the present disclosure. Those of ordinary skill in the art may understand and implement the present disclosure without creative work.

Figure 4:
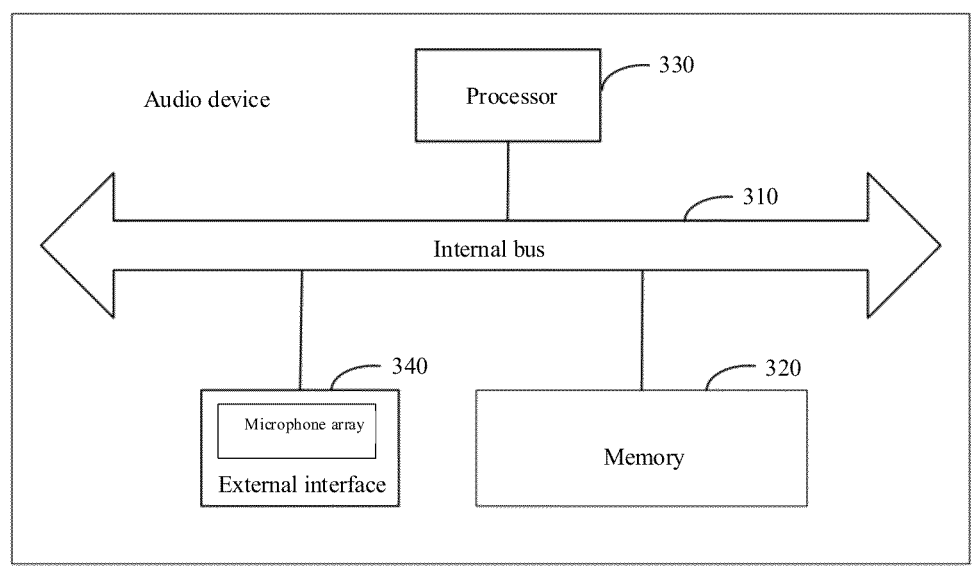
FIG. 4 illustrates a schematic structural diagram of an audio device according to an example of the present disclosure.

FIG. 4 illustrates a schematic structural diagram of an audio device according to an example of the present disclosure. The audio device may include: an internal bus 310, as well as a memory 320, a processor 330 and an external interface 340 that are connected through the internal bus 310.

The external interface 340 is configured to acquire data.

The memory 320 is configured to store machine-readable instructions corresponding to device control.

The processor 330 is configured to read the machine-readable instructions on the memory 320, and execute the machine-executable instructions to implement the following operations.

An acoustic signal set is received; a propagation characteristic of an acoustic signal in the acoustic signal set is determined; a device parameter associated with audio play quality to be used by the audio device is determined according to the propagation characteristic; and the audio device is controlled to play audio with the device parameter.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In the example of the disclosure, the computer-readable storage medium may be in various forms. For example, in different examples, the machine readable storage medium may be: a Random Access Memory (RAM), a volatile memory, a non-volatile memory, a flash memory, a storage driver (such as a hard disk drive), a solid state disk, any type of memory disk (such as an optical disc and a Digital Video Disk (DVD)), or a similar storage medium, or a combination thereof. Particularly, the computer-readable medium may even be paper or another suitable medium on which the program is printed. By use of the medium, the program can be electronically captured (such as optical scanning), and then compiled, interpreted and processed in a suitable mode, and then stored in a computer medium.

Other examples of the present disclosure will be apparent to those skilled in the art from consideration of the specification and practice of the present disclosure disclosed here. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

In order to overcome the problem in the related art, a device control method and apparatus are provided in the disclosure.

According to a first aspect of the present disclosure, a device control method is provided, which may be applied to an audio device, and include: receiving an acoustic signal set; determining a propagation characteristic of an acoustic signal in the acoustic signal set; determining, according to the propagation characteristic, a device parameter associated with audio play quality to be used by the audio device; and controlling the audio device to play audio with the device parameter.

In some example, the acoustic signal set includes acoustic signals sent by a terminal at different positions around the audio device; the propagation characteristic includes a propagation duration, a propagation speed and a propagation direction; and determining, according to the propagation characteristic, the device parameter associated with the audio play quality to be used by the audio device may include: for each of the different positions, calculating a respective distance between the position and the audio device according to a propagation duration and a propagation speed of an acoustic signal sent by the terminal at the position; and determining the device parameter according to distances from the different positions to the audio device and propagation directions of the acoustic signals.

In some example, determining the device parameter according to the distances from the different positions to the audio device and the propagation directions of the acoustic signals may include: determining, according to the distances from the different positions to the audio device and the propagation directions of the acoustic signals, a region enclosed by the different positions; determining at least one of: a size of the region, or position information of the audio device within the region; and determining the device parameter according to the at least one of: the size of the region, or the position information of the audio device within the region.

In some example, each of the acoustic signals carries respective sending time; the audio device includes a microphone array; and determining the propagation characteristic of the acoustic signal in the acoustic signal set may include: in response to receiving the acoustic signal sent by the terminal at each of the different positions, determining receiving time of the acoustic signal sent by the terminal at the position and acquiring sending time carried in the acoustic signal sent by the terminal at the position; determining, according to the receiving time and the sending time of the acoustic signal sent by the terminal at the position, the propagation duration of the acoustic signal sent by the terminal at the position; and determining the propagation direction of the acoustic signal by using the microphone array.

In some example, acquiring the sending time carried in the acoustic signal sent by the terminal at the position may include that: in response to that the acoustic signal sent by the terminal at the position includes signals associated with different frequency information, determining a digit corresponding to each piece of the different frequency information based on a preset correspondence relationship between frequency information and digits; combining digits corresponding to the different frequency information; and determining, based on the combined digits, the sending time of the acoustic signal sent by the terminal at the position.

In some example, the acoustic signal set includes an acoustic signal sent by a terminal at a position and a reflection signal of the acoustic signal sent by the terminal; the propagation characteristic includes receiving time; and determining, according to the propagation characteristic, the device parameter associated with the audio play quality to be used by the audio device may include: calculating a time difference between receiving time of the acoustic signal sent by the terminal and receiving time of the reflection signal of the acoustic signal sent by the terminal; and determining the device parameter according to the time difference.

In some example, calculating the time difference between the receiving time of the acoustic signal sent by the terminal and the receiving time of the reflection signal of the acoustic signal sent by the terminal may include: in response to that the acoustic signal set includes a plurality of reflection signals of the acoustic signal sent by the terminal, determining an earliest received reflection signal among the plurality of reflection signals; and calculating a time difference between the receiving time of the acoustic signal sent by the terminal and receiving time of the earliest received reflection signal.

In some example, the device parameter includes at least one of the following: a device parameter for adjusting a frequency response, a device parameter for adjusting loudness, a device parameter for adjusting a phase, or a device parameter for adjusting reverberation.

According to a second aspect of the present disclosure, a device control apparatus is provided, which may be applied to an audio device, and include: a receiving module, configured to receive an acoustic signal set; a first determination module, configured to determine a propagation characteristic of an acoustic signal in the acoustic signal set; a second determination module, configured to determine, according to the propagation characteristic, a device parameter associated with audio play quality to be used by the audio device; and a play module, configured to control the audio device to play audio with the device parameter.

In some example, the acoustic signal set includes acoustic signals sent by a terminal at different positions around the audio device; the propagation characteristic includes a propagation duration, a propagation speed and a propagation direction; and the second determination module includes: a first calculation submodule, configured to: for each of the different positions, calculate a respective distance between the position and the audio device according to a propagation duration and a propagation speed of an acoustic signal sent by the terminal at the position; and a first determination submodule, configured to determine the device parameter according to distances from the different positions to the audio device and propagation directions of the acoustic signals.

In some example, the first determination submodule may include: a first determination unit, configured to determine, according to the distances from the different positions to the audio device and the propagation directions of the acoustic signals, a region enclosed by the different positions; a second determination unit, configured to determine at least one of: a size of the region, or position information of the audio device within the region; and a third determination unit, configured to determine the device parameter according to the at least one of: the size of the region, or the position information of the audio device within the region.

In some example, each of the acoustic signals carries respective sending time; the audio device includes a microphone array; and the first determination submodule includes: a fourth determination unit, configured to: in response to receiving the acoustic signal sent by the terminal at each of the different positions, determine receiving time of the acoustic signal sent by the terminal at the position; an acquisition unit, configured to acquire sending time carried in the acoustic signal sent by the terminal at the position; a fifth determination unit, configured to determine, according to the receiving time and the sending time of the acoustic signal sent by the terminal at the position, the propagation duration of the acoustic signal sent by the terminal at the position; and a sixth determination unit, configured to determine the propagation direction of the acoustic signal by using the microphone array.

In some example, the acquisition unit may include: a first determination subunit, configured to: in response to that the acoustic signal sent by the terminal at the position includes signals associated with different frequency information, determine a digit corresponding to each piece of the different frequency information based on a preset correspondence relationship between frequency information and digits; a combination subunit, configured to combine digits corresponding to the different frequency information; and a second determination subunit, configured to determine, based on the combined digits, the sending time of the acoustic signal sent by the terminal at the position.

In some example, the acoustic signal set includes an acoustic signal sent by a terminal at a position and a reflection signal of the acoustic signal sent by the terminal; the propagation characteristic includes receiving time; and the second determination module may include: a second calculation submodule, configured to calculate a time difference between receiving time of the acoustic signal sent by the terminal and receiving time of the reflection signal of the acoustic signal sent by the terminal; and a second determination submodule, configured to determine the device parameter according to the time difference.

In some example, the second calculation submodule may include: a determination unit, configured to: in response to that the acoustic signal set includes a plurality of reflection signals of the acoustic signal sent by the terminal, determine an earliest received reflection signal among the plurality of reflection signals; and a calculation unit, configured to calculate a time difference between the receiving time of the acoustic signal sent by the terminal and receiving time of the earliest received reflection signal.

In some example, the device parameter includes at least one of the following: a device parameter for adjusting a frequency response, a device parameter for adjusting loudness, a device parameter for adjusting a phase, or a device parameter for adjusting reverberation.

According to a third aspect of the present disclosure, provided is a non-transitory computer-readable storage medium having stored thereon a computer program that, when being executed by a processor, implements actions of the method in the first aspect.

According to a fourth aspect of the present disclosure, provided is an audio device, including: a processor; and a memory, configured to store processor-executable instructions, wherein the processor is configured to: receive an acoustic signal set; determine a propagation characteristic of an acoustic signal in the acoustic signal set; determine, according to the propagation characteristic, a device parameter associated with audio play quality to be used by the audio device; and control the audio device to play audio with the device parameter.

The technical solutions provided in the examples of the present disclosure may have the following beneficial effects.

In the examples of the present disclosure, an audio device receives an acoustic signal set, determines a propagation characteristic of an acoustic signal in the acoustic signal set, determines, according to the propagation characteristic, a device parameter associated with audio play quality to be used by the audio device, and controls the audio device to play audio with the device parameter. In the examples of the present disclosure, the audio device can dynamically adjust the device parameter of the audio device according to the propagation characteristic of the received acoustic signal, and play the audio according to the dynamically adjusted device parameter, thereby enriching audio play modes and ensuring the audio play quality.

It is to be understood that the above general descriptions and detailed descriptions below are only exemplary and explanatory and not intended to limit the present disclosure.

What is claimed is:

1. A device control method, applied to an audio device, comprising:
receiving, by a microphone array of the audio device, an acoustic signal set, wherein the acoustic signal set comprises acoustic signals sent by a terminal at different positions around the audio device;
determining, by the microphone array, a propagation characteristic of an acoustic signal in the acoustic signal set, wherein the propagation characteristic comprises a propagation duration, a propagation speed and a propagation direction, the propagation duration and the propagation direction are determined according to a position of the microphone array and a position of the terminal in response to determining that the acoustic signal in the acoustic signal set is sent, and the propagation speed has a fixed value in a fixed propagation medium;
for each position among the different positions, calculating a distance between the position and the audio device according to the propagation duration and the propagation speed of the acoustic signal sent by the terminal at the position; and determining the device parameter according to distances from the different positions to the audio device and propagation directions of the acoustic signals; and
controlling the audio device to play audio with the device parameter.

2. The method of claim 1, wherein determining the device parameter according to the distances from the different positions to the audio device and the propagation directions of the acoustic signals comprises:
determining, according to the distances from the different positions to the audio device and the propagation directions of the acoustic signals, a region enclosed by the different positions;
determining at least one of: a size of the region, or position information of the audio device within the region; and
determining the device parameter according to at least one of: the size of the region, or the position information of the audio device within the region.

3. The method of claim 1, wherein each of the acoustic signals carries a sending time; and
wherein determining the propagation characteristic of the acoustic signal in the acoustic signal set further comprises:
in response to receiving the acoustic signal sent by the terminal at each of the different positions, determining a receiving time of the acoustic signal sent by the terminal at the position and acquiring a sending time carried in the acoustic signal sent by the terminal at the position;
determining, according to the receiving time and the sending time of the acoustic signal sent by the terminal at the position, the propagation duration of the acoustic signal sent by the terminal at the position; and
determining the propagation direction of the acoustic signal by using the microphone array.

4. The method of claim 3, wherein acquiring the sending time carried in the acoustic signal sent by the terminal at the position comprises:
in response to that the acoustic signal sent by the terminal at the position comprises signals associated with different frequency information, determining a digit corresponding to each piece of the different frequency information based on a preset correspondence relationship between frequency information and digits;
combining digits corresponding to the different frequency information; and
determining, based on the combined digits, the sending time of the acoustic signal sent by the terminal at the position.

5. The method of claim 4, wherein the frequency information comprises a frequency, or a frequency band.

6. The method of claim 4, wherein the digits corresponding to the different frequency information comprise hour digits, minute digits and second digits of the sending time of the acoustic signal, and
wherein determining, based on the combined digits, the sending time of the acoustic signal sent by the terminal at the position further comprises:
determining the hour digits, the minute digits, and the second digits of the sending time based on the combined digits.

7. The method of claim 1, wherein the acoustic signal set comprises an acoustic signal sent by a terminal at a position and a reflection signal of the acoustic signal sent by the terminal; the propagation characteristic comprises a receiving time; and
wherein determining, according to the propagation characteristic, the device parameter associated with the audio play quality to be used by the audio device further comprises:
calculating a time difference between a receiving time of the acoustic signal sent by the terminal and a receiving time of the reflection signal of the acoustic signal sent by the terminal; and
determining the device parameter according to the time difference.

8. The method of claim 7, wherein calculating the time difference between the receiving time of the acoustic signal sent by the terminal and the receiving time of the reflection signal of the acoustic signal sent by the terminal comprises:
in response to that the acoustic signal set comprises a plurality of reflection signals of the acoustic signal sent by the terminal, determining an earliest received reflection signal among the plurality of reflection signals; and
calculating a time difference between the receiving time of the acoustic signal sent by the terminal and a receiving time of the earliest received reflection signal.

9. The method of claim 1, wherein the device parameter comprises at least one of the following:
a device parameter for adjusting a frequency response,
a device parameter for adjusting loudness,
a device parameter for adjusting a phase, or
a device parameter for adjusting reverberation.

10. An audio device, comprising:
a processor; and
a memory, configured to store processor-executable instructions,
wherein the processor is configured to:
receive an acoustic signal set, wherein the acoustic signal set comprises acoustic signals sent by a terminal at different positions around the audio device;
determine a propagation characteristic of an acoustic signal in the acoustic signal set, wherein the propagation characteristic comprises a propagation duration, a propagation speed and a propagation direction, the propagation duration and the propagation direction are determined according to a position of a microphone array and a position of the terminal in response to determining that the acoustic signal in the acoustic signal set is sent, and the propagation speed has a fixed value in a fixed propagation medium;

for each position among the different positions, calculate a respective distance between the position and the audio device according to the propagation duration and the propagation speed of the acoustic signal sent by the terminal at the position; and determine the device parameter according to distances from the different positions to the audio device and propagation directions of the acoustic signals; and control the audio device to play audio with the device parameter.

11. The audio device of claim 10, wherein the processor is further configured to:

determine, according to the distances from the different positions to the audio device and the propagation directions of the acoustic signals, a region enclosed by the different positions;

determine at least one of: a size of the region, or position information of the audio device within the region; and determine the device parameter according to at least one of: the size of the region, or the position information of the audio device within the region.

12. The audio device of claim 10, wherein each of the acoustic signals carries a sending time; the audio device comprises the microphone array; and wherein the processor is further configured to:

in response to receiving the acoustic signal sent by the terminal at each of the different positions, determine a receiving time of the acoustic signal sent by the terminal at the position;

acquire a sending time carried in the acoustic signal sent by the terminal at the position;

determine, according to the receiving time and the sending time of the acoustic signal sent by the terminal at the position, the propagation duration of the acoustic signal sent by the terminal at the position; and determine the propagation direction of the acoustic signal by using the microphone array.

13. The audio device of claim 12, wherein the processor is further configured to:

in response to that the acoustic signal sent by the terminal at the position comprises signals associated with different frequency information, determine a digit corresponding to each piece of the different frequency information based on a preset correspondence relationship between frequency information and digits;

combine digits corresponding to the different frequency information; and determine, based on the combined digits, the sending time of the acoustic signal sent by the terminal at the position.

14. The audio device of claim 13, wherein the digits corresponding to the different frequency information comprise hour digits, minute digits and second digits of the sending time of the acoustic signal, and wherein the processor is further configured to:

determine the hour digits, the minute digits and the second digits of the sending time of the acoustic signal based on the combined digits.

15. The audio device of claim 10, wherein the acoustic signal set comprises an acoustic signal sent by a terminal at a position and a reflection signal of the acoustic signal sent by the terminal; the propagation characteristic comprises a receiving time; and wherein the processor is further configured to:

calculate a time difference between a receiving time of the acoustic signal sent by the terminal and a receiving time of the reflection signal of the acoustic signal sent by the terminal; and determine the device parameter according to the time difference.

16. The audio device of claim 15, wherein the processor is further configured to:

in response to that the acoustic signal set comprises a plurality of reflection signals of the acoustic signal sent by the terminal, determine an earliest received reflection signal among the plurality of reflection signals; and calculate a time difference between the receiving time of the acoustic signal sent by the terminal and a receiving time of the earliest received reflection signal.

17. The audio device of claim 10, wherein the device parameter comprises at least one of the following:

a device parameter for adjusting a frequency response, a device parameter for adjusting loudness, a device parameter for adjusting a phase, or a device parameter for adjusting reverberation.

18. A non-transitory computer-readable storage medium having stored thereon a computer program that, when being executed by a processor, implements acts comprising:

receiving an acoustic signal set, wherein the acoustic signal set comprises acoustic signals sent by a terminal at different positions around the audio device;

determining a propagation characteristic of an acoustic signal in the acoustic signal set, wherein the propagation characteristic comprises a propagation duration, a propagation speed and a propagation direction, the propagation duration and the propagation direction are determined according to a position of a microphone array and a position of the terminal in response to determining that the acoustic signal in the acoustic signal set is sent, and the propagation speed has a fixed value in a fixed propagation medium;

for each position among the different positions, calculating a distance between the position and the audio device according to the propagation duration and the propagation speed of the acoustic signal sent by the terminal at the position; and determining the device parameter according to distances from the different positions to the audio device and propagation directions of the acoustic signals; and controlling the audio device to play audio with the device parameter.

* * * * *